Figure 1:
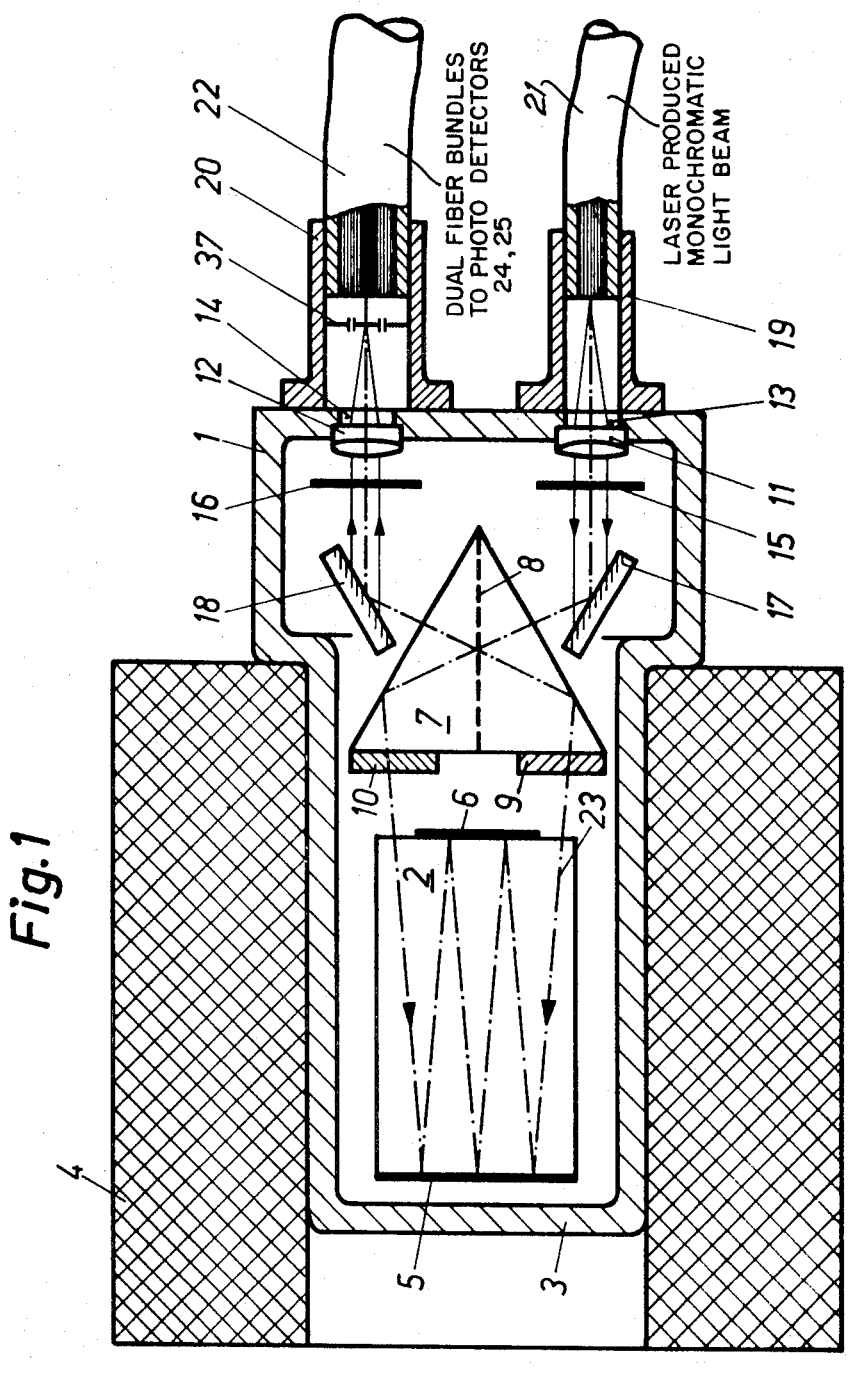

United States Patent

[11] 3,621,390

[72] Inventor Friedrick K. Von Willisen, Zurich, Switzerland
[21] Appl. No. 818,290
[22] Filed Apr. 22, 1969
[45] Patented Nov. 16, 1971
[73] Assignee Aktiengesellschaft Brown, Boveri & Cie Baden, Switzerland
[32] Priority Apr. 23, 1968
[33] Switzerland
[31] 60005/68

[54] ARRANGEMENT FOR MEASURING A TIME VARIABLE MAGNETIC FIELD USING THE FARADAY EFFECT
6 Claims, 2 Drawing Figs.

[52] U.S. Cl. ................................................. 324/96, 324/43 L, 350/151
[51] Int. Cl. .................................................. G01r 31/00
[50] Field of Search .................................... 324/43 L, 96; 350/151, 158

[56] References Cited
UNITED STATES PATENTS
3,495,892 2/1970 Dailey .......................... 350/151
3,502,978 3/1970 Bernard ........................ 324/96

Primary Examiner—Michael J. Lynch
Attorney—Pierce, Scheffler & Parker

ABSTRACT: An arrangement for measuring a time-variable magnetic field in order to measure, for example, the current flowing in a high-voltage line, utilizes a measuring head subjected to a magnetic field proportional to the line current which encloses a magneto-optical element in the form of a Faraday cell that functions in conjunction with an optical divider in the form of a Koesters prism to form a two-beam interferometer. A laser produced monochromatic light beam fed to the measuring head over an optical fiber bundle passes through a polarizing filter onto the divider plane of the Koesters prism where it is split into two partial beams. One beam passes through a first quarter-wave plate in which it is circularly polarized in a dextrorotary sense, thence through the Faraday cell where it undergoes multiple reflection in the magnetic field and thence through a second quarter-wave plate back to the divider plane of the Koesters prism. The other beam passes through the same path but in the opposite direction, passing first through the second quarter-wave plate where it is polarized in a levorotary sense, and ultimately arriving back at the divider plane. The two returning beams combine in the divider plane of the Koesters prism to form an outgoing beam consisting of two 90° phase-displaced components modulated in intensity as a function of the variation in the magnetic field. The two phase-shifted beam components are passed respectively through optical fiber bundles to a processing circuit where they are converted into correspondingly modulated electrical signal components which are then demodulated to a final output electrical signal constituting a measure of the current in the high-voltage line.

ARRANGEMENT FOR MEASURING A TIME VARIABLE MAGNETIC FIELD USING THE FARADAY EFFECT

The present invention concerns an arrangement for measuring a time-variable magnetic field using the Faraday effect.

Such arrangements are used, for example, for measuring the electric current in high voltage lines, where the current to be measured produces a magnetic field in a magneto-optical element at high voltage potential and where the rotation of the polarization plane of a beam passing through this magneto-optical element is determined. In a known method of this type, the rotation of the polarization plane of the beam is converted into a variation of the optical radiation intensity. The relation between angle of rotation and light intensity is not linear, however, and is ambiguous for angles of rotation of more than $\pi/2$. A limitation to angles of rotation of less than $\pi/2$ would have the result, however, that extremely small angles of rotation would have to be resolved in the interest of a sufficiently wide dynamic range. In another known method, the problem of the nonlinearity is avoided by compensating the polarization rotation of the beam produced by the field to be measured in another magnetic-optical element, the compensating magnetic field being a measure for the field to be measured. The application of this method to the measurement of electric current necessitates, however, relatively expensive devices in those cases where rapid variations of the current intensity, such as in a short circuit, for example, must be reproduced correctly, because of the high power consumption of the regulating device.

The object of the invention is an arrangement for measuring the variation of a magnetic field, using the Faraday effect, where the measuring accuracy and time resolving power achieved with relatively simple and inexpensive means are substantially higher than in the known methods, while the device is to a great extent insensitive to mechanical vibrations and temperature influences.

The arrangement according to the invention is characterized by the fact that a monochromatic beam is split in a divider arrangement in its intensity into two partial beams, that the outgoing split beams are each polarized circularly by an associated circular polarizer in opposite sense, and that the split beams follow the same light path, starting from the divider arrangement and leading back to it, in opposite direction, that two circularly polarized partial beams pass through a magneto-optical element in this light path in which the difference of the optical path lengths of the two split beams is varied proportionally to the field-strength of the magnetic field prevailing there, and that the returning split beams interfere with each other in the divider arrangement, producing an outgoing an outgoing beam, modulated in its intensity, whose intensity variation is measured and from which an output signal is derived that is proportional to the difference of the optical path lengths of the split beams.

Figure 2:
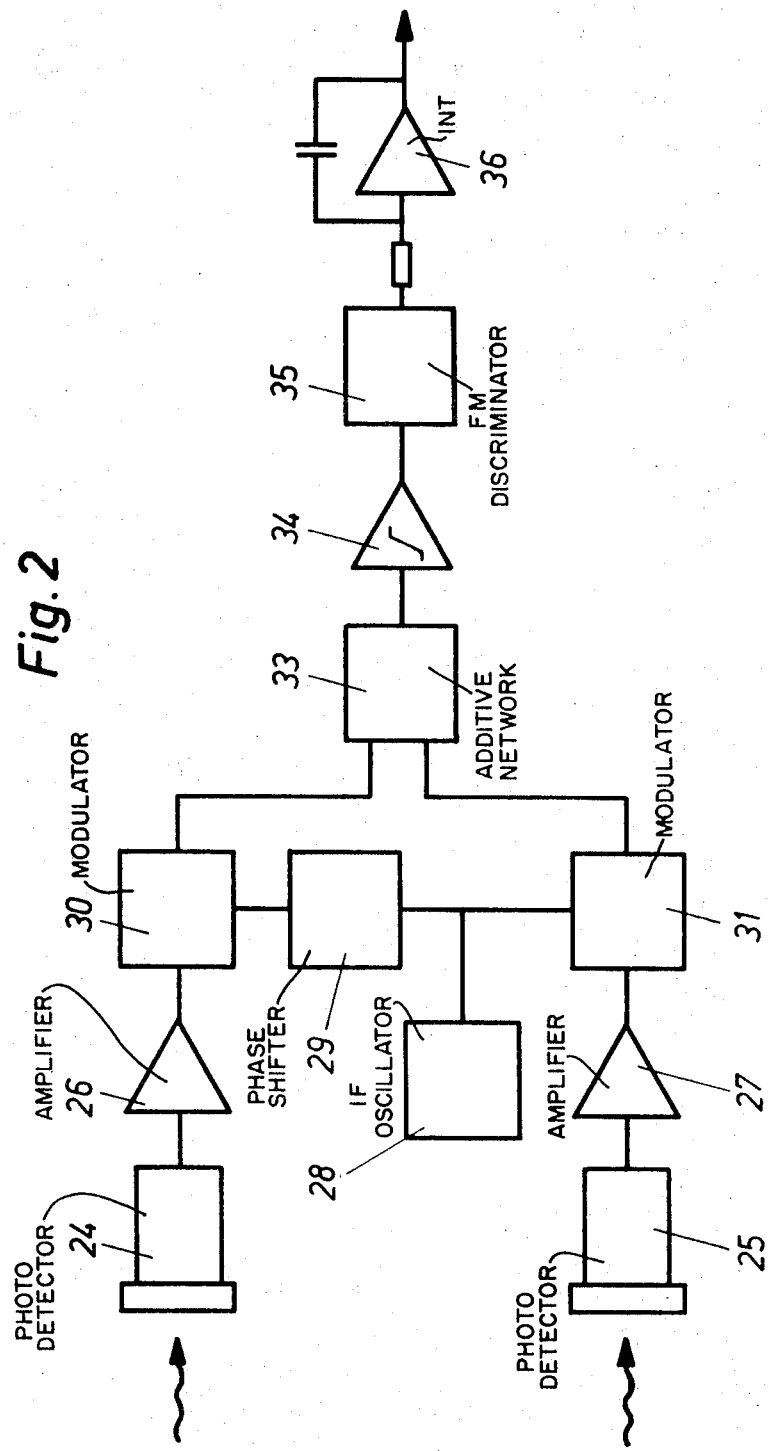

The invention will be described below more fully on the basis of an arrangement for measuring the variations in time and amplitude of a current flowing in a high-voltage transmission line in conjunction with the accompanying drawings wherein:

FIG. 1 is a longitudinal section of the measuring head including its connections to the incoming and outgoing optical fiber bundles and FIG. 2 is a block diagram of the electrical circuit at the receiving end of the optical fiber bundles, said electrical circuit functioning to process the electro-optical output of the measuring head.

With reference now to FIG. 1 there is depicted an interferometric measuring head in longitudinal section. This measuring head contains in a gastight housing 1 a magneto-optical element 2 which in conjunction with a Koesters prism 7 forms a two-beam interferometer. The cylindrical part 3 of the housing 1, inside of which the magneto-optical element 2 is arranged, is enclosed by a magnetic coil 4, e.g. constituted by a few turns of the high voltage conductor carrying the electrical current of the line which produces the time variable magnetic field to which the Faraday cell is subjected. The magneto-optical element 2 consists of a prism of magneto-optical material which is reflection-coated on its plane-parallel end faces 5, 6. The reflective coating has on the end face 6 facing the measuring interferometer at the edge two recesses for the passage of the beams.

The measuring interferometer contains a Koesters prism 7 acting as a divider arrangement, which is so arranged that its divider plane 8 is substantially perpendicular to the end faces 5, 6 of the magneto-optical element. On the hypotenuse of the Koesters prism 7 perpendicular to the divider plane 8 are arranged two $\lambda/4$ plates 9, 10 acting as circular polarizers in conjunction with polarization filter 15. An entrance lens 11 and an exit lens 12 respectively are arranged in apertures of the housing bottom. Between the entrance lens 11 and the outlet lens 12 respectively on the one hand, and the Koesters prism 7, on the other hand, are arranged a polarization filter each, 15 and 16 respectively, and a reflecting mirror, 17 and 18 respectively.

A single or double optical fiber 21, 22 leads to the apertures 13, 14 of the housing bottom over sockets 19, 20. For separating two beams passing through the optical fiber 22, a diaphragm 37 with two apertures is provided inside the socket 20 in the focusing plane of the exit lens 12.

The measuring head, containing coil 4 which carries the current or a portion thereof in the high-voltage line, is connected, on the one hand, over the optical fiber 21 with a gas laser which produces a monochromatic light beam and, on the other hand, over the two light conductor paths of the double optical fiber 22 with two photo detectors. The output signals of these photo detectors are fed to a processing circuit to be described below. The gas laser and the photo detectors with the processing circuit have ground potential.

The method of operation of the arrangement described above is as follows:

The monochromatic beam produced in the gas laser is fed over the optical fiber 21, the entrance lens 11, the polarization filter 15 and the reflecting mirror 17 to the Koesters prism 7, on the divider plane 8 of which it is split into two partial beams. One split beam passes through $\lambda 4$ plate 9 in which it is circularly polarized in a dextrorotary sense in the closed optical path 23, the magneto-optical element 2, on the reflective coated end faces 5, 6 of which it undergoes a multiple reflection, and arrives finally by way of $\lambda/4$ plate 10 back at the divider plane 8 of the Koesters prism 7. The other split beam passes through the same closed path 23 in the opposite direction, but is polarized circularly in the $\lambda/4$ plate 10 in a levorotary sense. The two returning split beams combine in the divider plane 8 of the Loesters prism 7 to an outgoing beam, which is fed over the reflecting mirror 18 and the polarization filter 16 to the exit lens 12. As long as there is no magnetic field, the effective optical paths of the two split beams passing through the light path 23 in opposite directions are equal, so that the outgoing beam does not show any interference phenomena varying in time. When a magnetic field appears, the effective light path becomes different in the magneto-optical element 2 for the first split beam polarized in a dextrorotatory sense from that of the second split beam polarized in a levorotary sense. The time-dependent difference $(\lambda/2\pi) \Phi (t)$ of these effective light paths is strictly proportional, as it can be shown, to the field strength $H(t)$ of the time variable magnetic field to be measured, where $\lambda$ is the optical wavelength in the vacuum. In a time-variable magnetic field, the outgoing beam shows an interferometric modulation corresponding to this optical path difference.

For the determination of the phase function $\Phi (t)$ from the modulated outgoing beam it is therefore necessary to determine the phase of the modulation in addition to the intensity value. To this end, two beams, phase-shifted by 90° in their modulation, are produced in the measuring head (FIG. 1). This is done by adjusting the magneto-optical element 2 in the drawing plane by a very small angle with respect to the Koesters prism 7 which causes the two interfering beams to be offset relative to one another whereby parallel interference fringes are produced with sinusoidally changing intensity. One thus obtains a relative shear of the wave fronts of the two split beams passing through the light path 23 in opposite direction. Due to this shear, a sinusoidal intensity variation is produced in the beam issuing from the divider plane 8 of the Koesters prism 7, which extends over the beam cross section in one direction. From this beam are coupled out, via two slit-shaped apertures of the diaphragm 37, two exit beams which are phase-shifted in their modulation by 90° and which are fed each over an optical path of the double optical fiber 22 to an associated photo detector 24, 25.

The processing circuit and its method of operation will be described with reference to FIG. 2.

The detector currents $i_1$, $i_2$, of the photodetectors 24, 25, after the DC components have been eliminated and after amplification in the stages 26, 27 have, the standardized form:

$$i_1 = \cos \Phi(t)$$
$$i_2 = \sin \Phi(t)$$

In an intermediate frequency oscillator 28 with connected phase-shifter 29 are produced two oscillator signals $g_1$, $g_2$ likewise phase-shifted by 90°, which have the frequency $\omega_o$ and are of the standardized form $$g_1 = \cos \omega_o t$$
$$g_2 = \sin \omega_o t$$

The oscillator frequency $\omega_o$ must satisfy the conditions $$\omega_o > \left|\frac{d\phi}{dt}\right|_{max} \text{ and } |\Delta\omega_o| \ll \left|\frac{d\phi}{dt}\right|_{min}$$

These oscillator signals are multiplied in the ring or balanced modulator stages 30, 31 with the signals $i_1$ and $i_2$, respectively, and the products fed to an additive networks 33 whose output signal $$G = i_1 g_1 \pm i_2 g_2 = \cos[(\omega_o t \pm \Phi(t))]$$ has the form of a true phase-modulated carrier frequency signal with the frequency deviation $$\Delta F = (1/2\pi)(d/dt)\Phi(t)$$

From this carrier frequency signal G is derived, by frequency demodulation in the FM-discriminator 35 and subsequent integration in the integration stage 36 a signal of the form $\Phi(t)$, i.e., the argument of sin $\Phi(t)$ or cos $\Phi(t)$, respectively, which is a measure of the current intensity to be measured in the high-voltage line.

I claim:

1. In an arrangement for measuring a time-varied magnetic field, the combination comprising an optical beam divider, means directing a monochromatic light beam into said divider to produce first and second outgoing beam components, first and second circular polarizers initially traversed by said first and second beam components respectively, said polarizers being oriented such that the beam components issuing initially therefrom are circularly polarized in opposite directions respectively, a magneto-optical element exhibiting a Faraday effect and which is located in and subjected to the magnetic field to be measured, said magneto-optical element being transversed by said circularly polarized beam components along the same path but in opposite directions whereby due to the Faraday effect a difference in the optical path length between said beam components proportional to said time variable magnetic field is produced, said first and second beam components being then passed through said second and first circular polarizers respectively and brought to interference in said divider thereby to produce an intensity-modulated light beam, and means including photodetector means deriving from said intensity modulated light beam sinusoidal electric signals the arguments of which are proportional to the magnetic field to be measured.

2. In an arrangement for measuring the variation in a magnetic field in order to measure, for example, the current flowing in a high voltage line, the combination comprising a measuring head subjected to a magnetic field proportional to the line current, said measuring head enclosing a magneto-optical element constituted by a Faraday cell which in cooperation with an optical beam divider constituted by a Koesters prism forms a two-beam interferometer, means directing a monochromatic light beam into said prism to produce at the divider plane therein first and second outgoing beam components, first and second circular polarizers initially traversed by said first and second beams respectively, said polarizers being oriented such that the beam components issuing initially therefrom are circularly polarized in opposite directions respectively, said polarized beam components being directed into said Faraday cell for multiple reflection between the plane parallel end surfaces thereof along the same path but in opposite directions whereby due to the Faraday effect a difference in the optical path length between said beam components proportional to the variation in said magnetic field is produced, said first and second beam components after issuing from said Faraday cell being passed through said second and first circular polarizers respectively and brought to interference in said prism to produce an intensity-modulated light beam from which sinusoidal electric signals are derived via means including photodetector means, the arguments of the sinusoidal signals being proportional to the magnitude of the field to be measured.

3. An arrangement as defined in claim 2 for measuring a variable magnetic field wherein said circular polarizers are constituted by quarter-wave plates secured to one face of said Koesters prism in general parallel relation to the end faces of said Faraday cell, and wherein the incident light beam is plane polarized in a direction parallel to the divider plane of said Koesters prism.

4. An arrangement as defined in claim 2 for measuring a variable magnetic field produced by current flow on a high-voltage line wherein said measuring head is subjected to the potential of the line and wherein said means including said photodetector means for deriving sinusoidal electric signals from said intensity-modulated light beam have ground potential and are connected to said measuring head by way of light-transmitting fiber bundles.

5. An arrangement as defined in claim 2 for measuring a variable magnetic field wherein said circular polarizers are constituted by quarter-wave plates secured to one face of said Koesters prism in general parallel relation to the end faces of said Faraday cell, and wherein the incident light beam is plane polarized in a direction perpendicular to the divider plane of said Koesters prism.

6. An arrangement as defined in claim 2 for measuring a variable magnetic field wherein said circular polarizers are constituted by quarter-wave plates secured to one end face of said prism and wherein said Faraday cell is rotated by a small angle relative photodetectors, said prism whereby the wave fronts of said first and second beam components interfering in said prism are sheared thus to produce a sinusoidal intensity distribution over the cross section of said intensity-modulated beam issuing therefrom, and which further includes two slit diaphragms disposed in the path of said intensity-modulated light beam issuing from said prism such that two light beams phase-shifted by 90° in modulation are separated, a pair of photodetectors, a pair of fiber bundles directing said phase-shifted light beams respectively to said photodetectors, a pair of amplifiers connected respectively to the outputs of said photodetectors, a pair of modulator stages correlated respectively to said amplifiers, an intermediate frequency oscillator, a phase shifter producing a phase shift of 90°, the two inputs to one of said modulator stages being constituted respectively by the output of the correlated amplifier and the output directly from said intermediate frequency oscillator, and the two inputs to the other modulator stage being constituted respectively by the output of the correlated amplifier and an output from said intermediate frequency oscillator following passage through said phase shifter, an additive network to which the outputs from said two modulator stages are connected, said additive network producing a carrier signal phase-modulated proportional to the magnetic field to be measured, and a frequency discriminator and integrator following said additive network for demodulating said phase-modulated carrier signal to determine the phase which is proportional to the magnetic field to be measured.

* * * * *

UNITED STATES PATENT OFFICE
CERTIFICATE OF CORRECTION

Patent No. 3,621,390         Dated Nov. 16, 1971

Inventor(s) Friedrick K. Von Willisen

It is certified that error appears in the above-identified patent and that said Letters Patent are hereby corrected as shown below:

Claim 6 - line 5 -- "photodetectors"

should be cancelled, and the word --- to --- should be inserted.

Signed and sealed this 23rd day of May 1972.

(SEAL)
Attest:

EDWARD M. FLETCHER, JR.          ROBERT GOTTSCHALK
Attesting Officer                Commissioner of Patents